United States Patent
Gadini et al.

[11] Patent Number: 5,968,395
[45] Date of Patent: Oct. 19, 1999

[54] BISTABLE ACTUATOR WITH TWO THERMAL ACTUATING ELEMENTS ELECTRICALLY OPERATED INDEPENDENTLY OF ONE ANOTHER OR MULTIPOSITION SETTING OF THE DEVICE

[75] Inventors: Costanzo Gadini; Fiorenzo Pivetta, both of Casale Montferrato, Italy

[73] Assignee: Eltek S.P.A., Casale Monferrato, Italy

[21] Appl. No.: 08/774,903

[22] Filed: Dec. 27, 1996

[51] Int. Cl.⁶ ........................................ H05B 1/02
[52] U.S. Cl. ................ 219/510; 219/518; 219/496; 219/508; 236/101 R
[58] Field of Search ................... 219/508–515, 219/518, 496, 494, 502, 493, 501; 236/101 R, 101 B, 43

[56] References Cited

U.S. PATENT DOCUMENTS

| | | |
|---|---|---|
| 2,928,233 | 3/1960 | Kimm . |
| 3,967,781 | 7/1976 | Kunz ...................................... 236/101 B |
| 4,347,975 | 9/1982 | Foller ..................................... 236/101 B |
| 4,375,029 | 2/1983 | Zacho et al. ............................ 219/493 |
| 4,633,238 | 12/1986 | Goessleer et al. ....................... 219/446 |

FOREIGN PATENT DOCUMENTS

| | | |
|---|---|---|
| 38 08 254 A1 | 12/1988 | Germany . |
| 43 36 794 C1 | 1/1995 | Germany . |
| 2 138 928 | 10/1984 | United Kingdom . |

*Primary Examiner*—Mark Paschall
*Attorney, Agent, or Firm*—Herbert Dubno

[57] ABSTRACT

A simple, low-cost, reliable thermoactuator device is described, being capable of taking a plurality of stable working position besides its rest position. One and the same body is associated with at least two thermoactuators whose arrangement is such as to make a movable actuation element capable of taking at least three stable working positions, which are obtained as a function of an electric signal to the supply terminals of either one or the other or both of the thermoactuators.

14 Claims, 14 Drawing Sheets

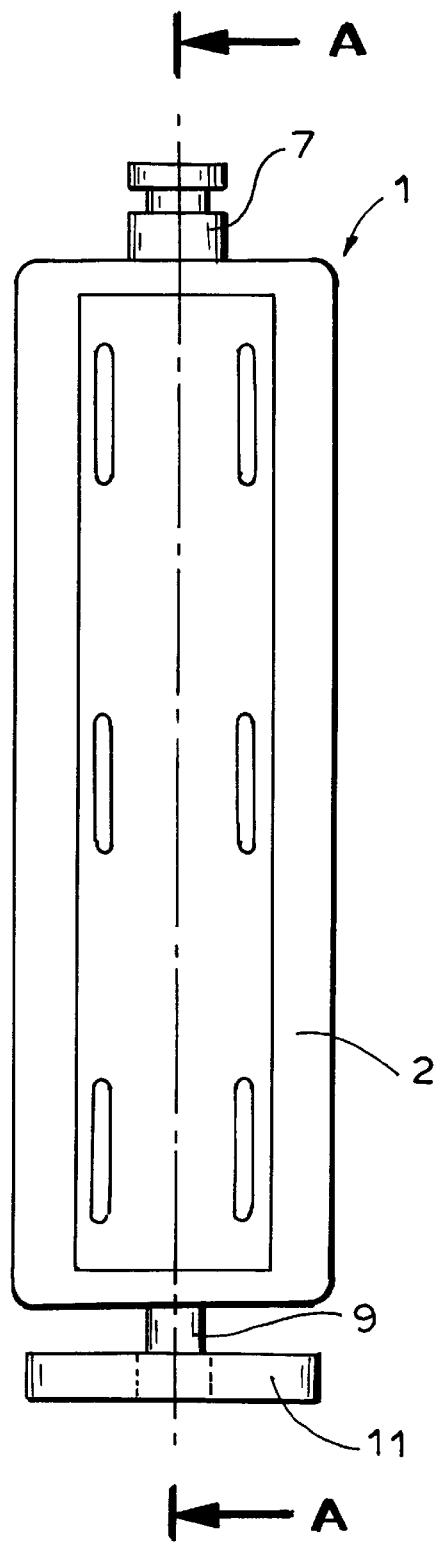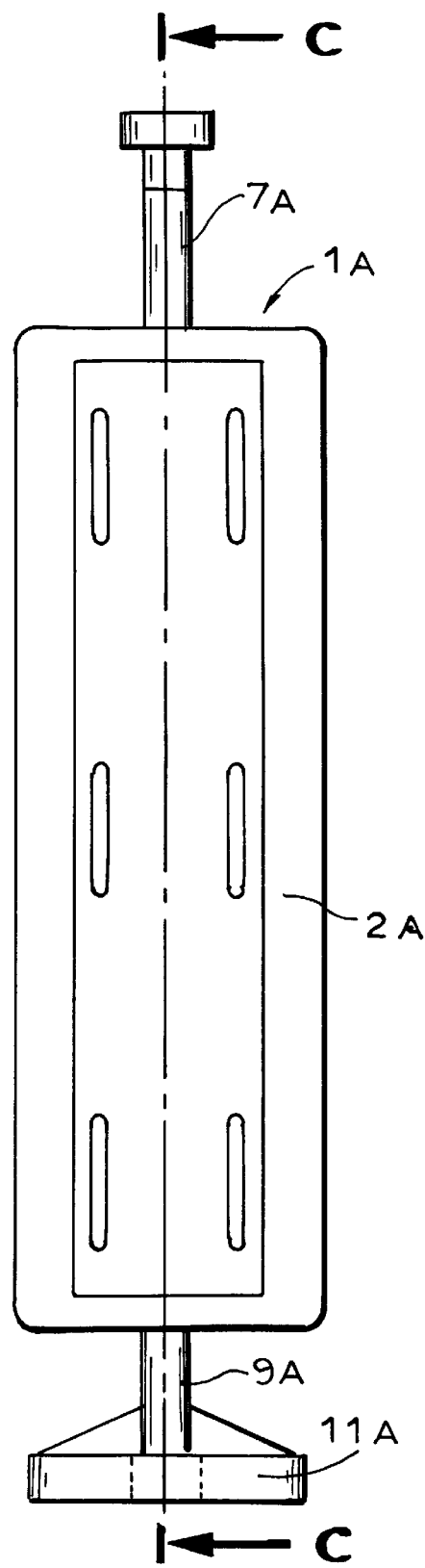

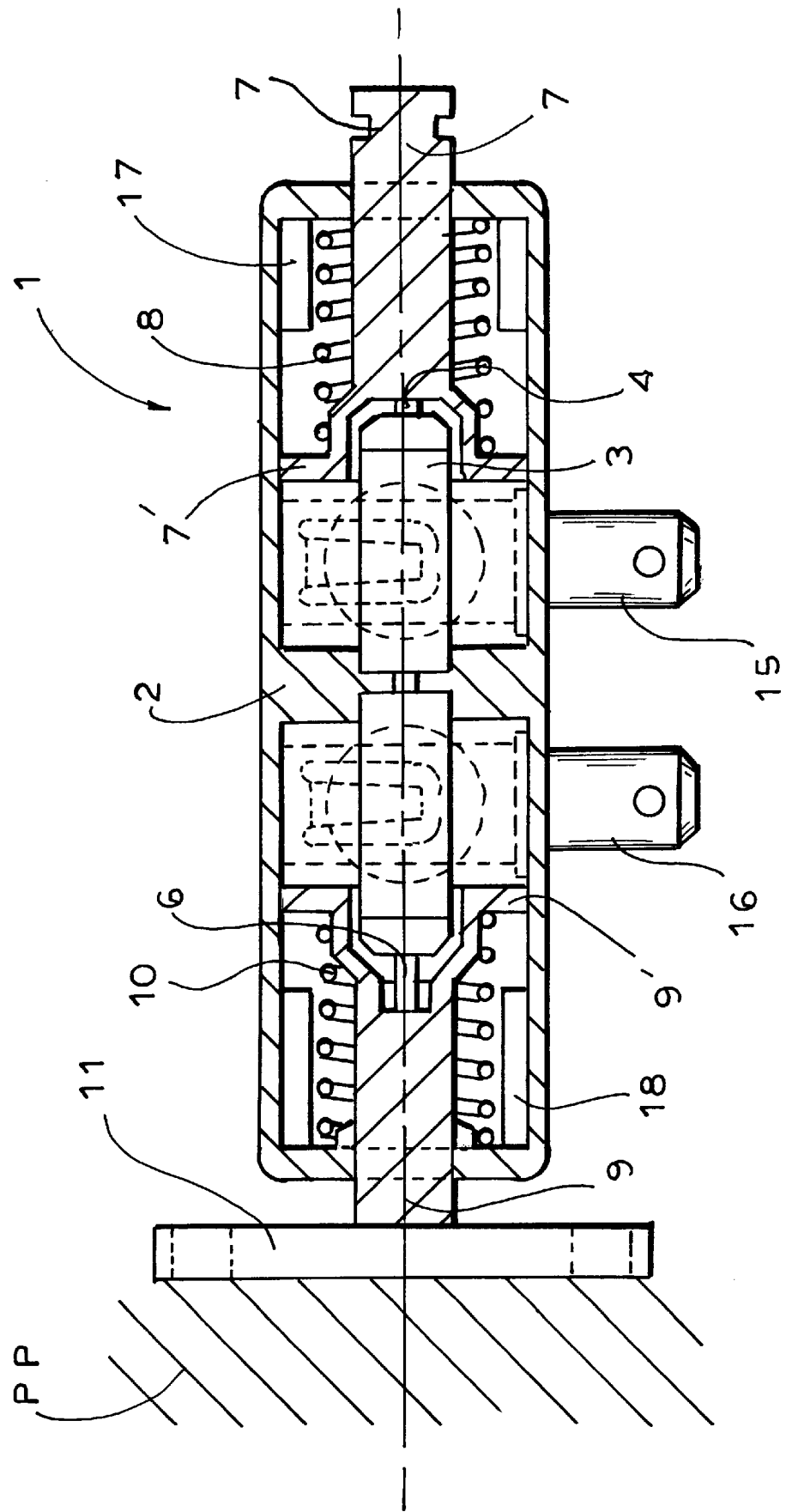

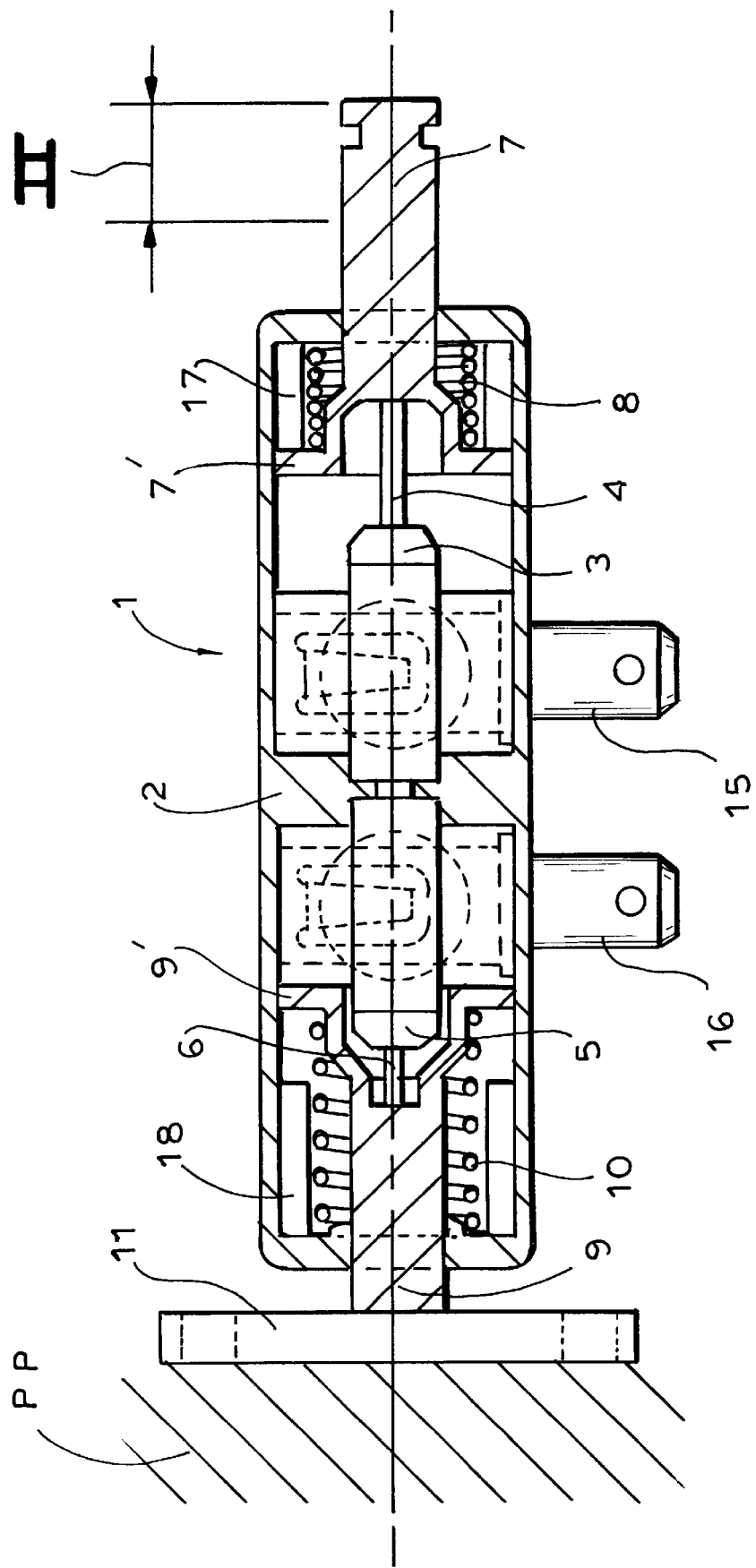

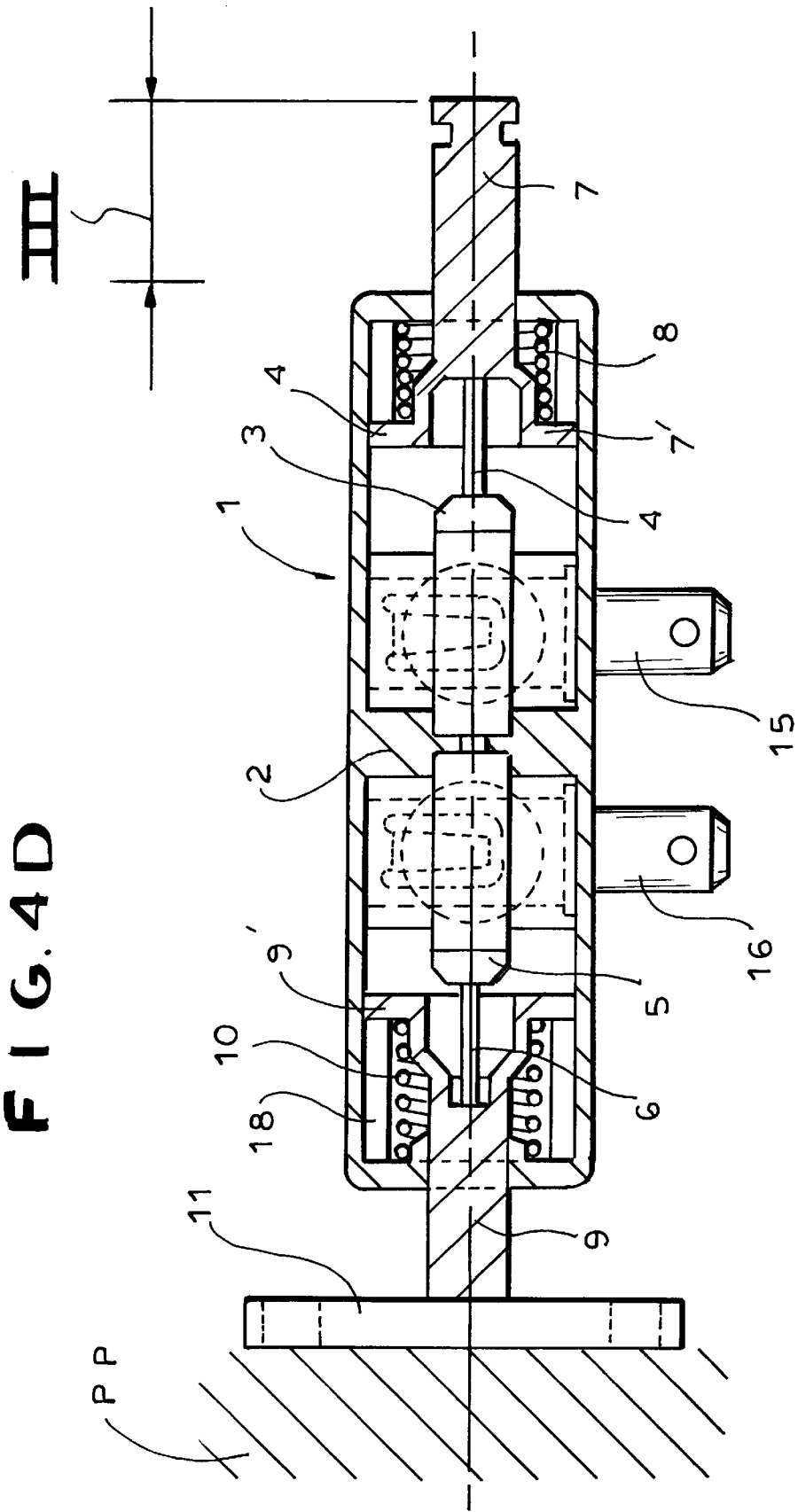

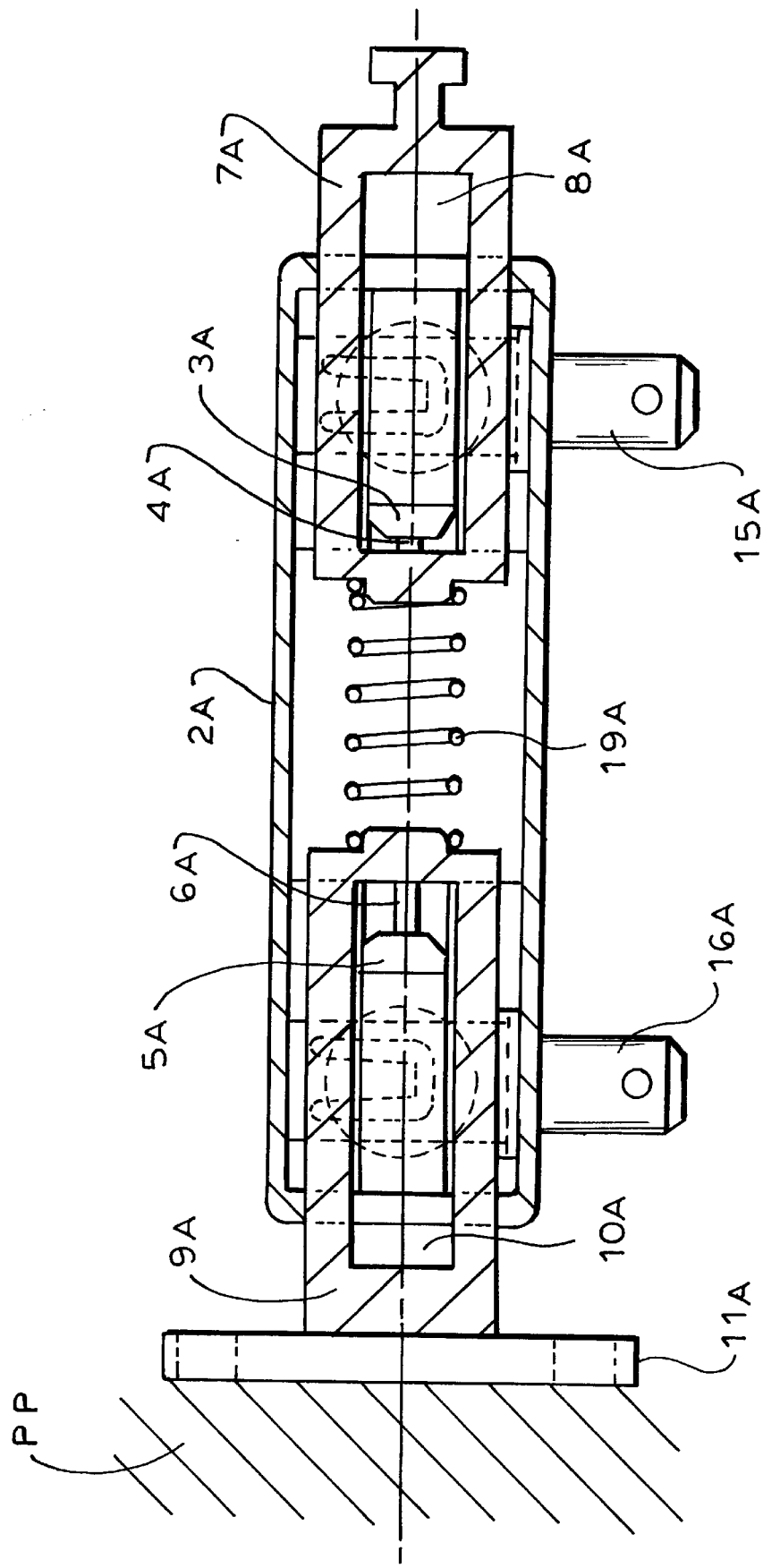

5,968,395

BISTABLE ACTUATOR WITH TWO THERMAL ACTUATING ELEMENTS ELECTRICALLY OPERATED INDEPENDENTLY OF ONE ANOTHER OR MULTIPOSITION SETTING OF THE DEVICE

SPECIFICATION

1. Field of the Invention

The present invention relates to an actuator device of thermal type.

2. Background of the Invention

Thermal actuator devices are already known for application in several fields including household appliances and environment conditioning. Such devices, also known as thermoactuators, usually comprise a housing made of a thermally conductive material (e.g. metal), connected with an electric heater. In said housing are normally contained a thermally expandable material (e.g. wax) and a thrust element. Typically the electric heater is a positive temperature factor resistance (PTC), electrically fed by two terminals.

When the feed terminals are under voltage, the electric heater generates heat and causes the thermally expandable material to expand. Such an expansion causes a linear displacement of the thruster toward the outside of the housing to reach a given position, which is generally determined by a mechanical end of stroke and can be defined as a stable working position.

When the electric feed ceases, the heater will cool down and the thermo-expandable material shrink, so causing the thruster to return to its initial rest position (possibly assisted by an elastic return element, i.e. a spring).

Thermal actuators of the type described above can be easily manufactured at low cost and are highly reliable in general. Another important advantage of these devices is that they can develop a. Other important advantages of these devices are a considerable power in spite of their compact size and are characterized by low-noise operation.

However, these devices are limited in that they have only one stable working position besides their rest position, unless sophisticated and delicate kinematic mechanisms are used.

OBJECT OF THE INVENTION

It is the object of the present invention to eliminate the above-mentioned drawback and to provide a thermal type actuator device of simple and compact design, which, though maintaining its low-cost, reliability and low-noise characteristics like the devices already known, will have a plurality of different work positions, with no need for complex mechanical kinematic motions or electronic circuits.

SUMMARY OF THE INVENTION

This object is attained with an actuation device having at least two thermoactuators each of which has a housing containing a therm-expansible material, an electric heating element, contact means for the electrical supply to the heating element and a thrust element which is moved by expansion of the therm-expansible material. The two thermoactuators are provided in a housing and can be independently energized to displace a movable actuation element relative to a support into a plurality of positions corresponding to separate energizations of the thermoactuators and collective or additive energization thereof. The thrust can act to draw the movable actuation element toward the support or to urge the movable actuation element away from the support.

BRIEF DESCRIPTION OF THE DRAWING

The features and the advantages of the present invention will appear evident from the following detailed description and the annexed drawing in which:

FIG. 1 shows a view of the device according to the present invention in a first possible embodiment;

FIG. 5 is an elevational view of the device according to the present invention in a possible second embodiment;

FIGS. 8A–8D show the device of FIGS. 5–7 in four different operating conditions;

DETAILED DESCRIPTION

Figure 2:
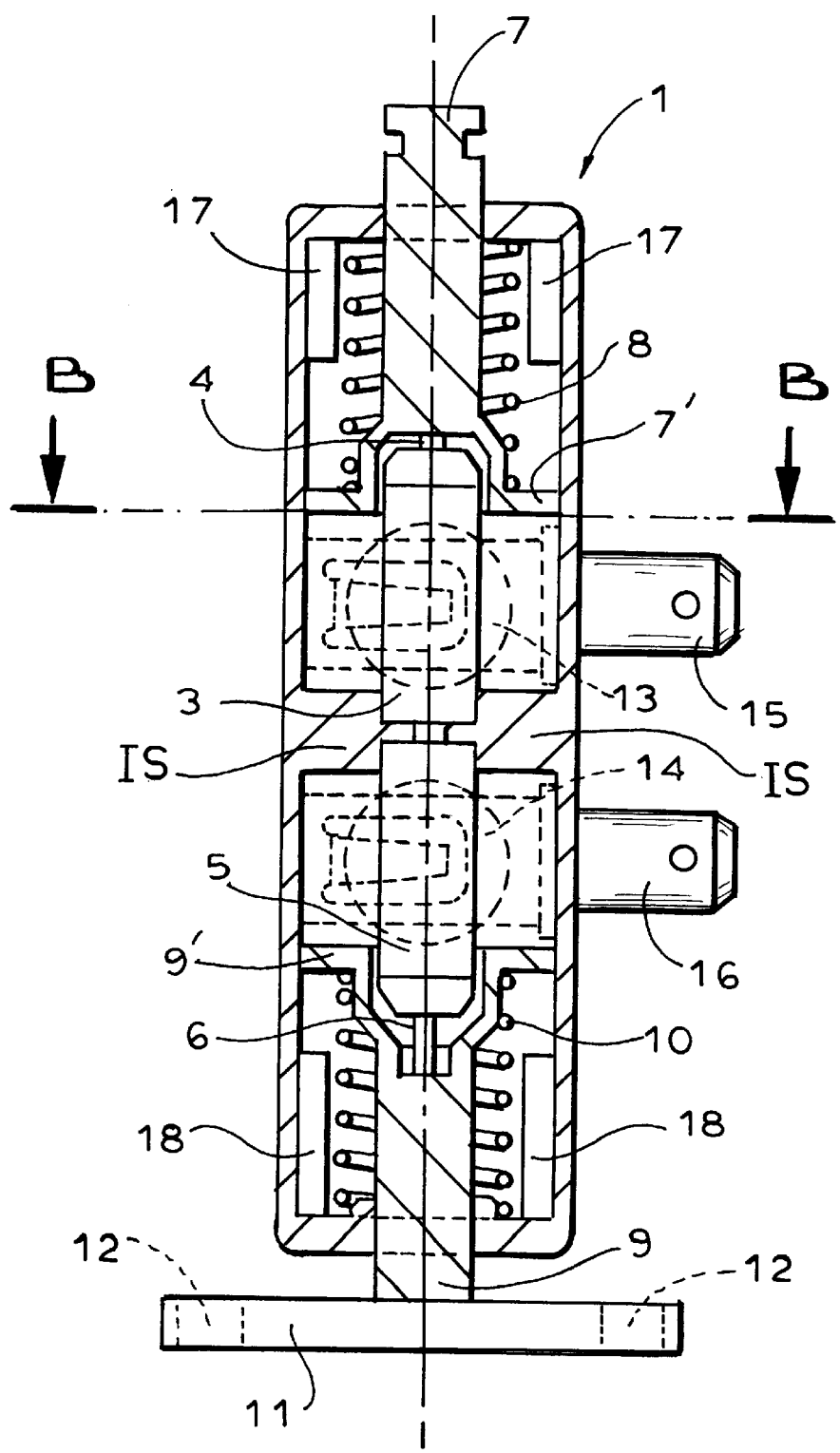
FIGS. 2 and 3 show respective sections of the device of FIG. 1 along the line A—A of FIG. 1 and line B—B of FIG. 2.
Figure 3:
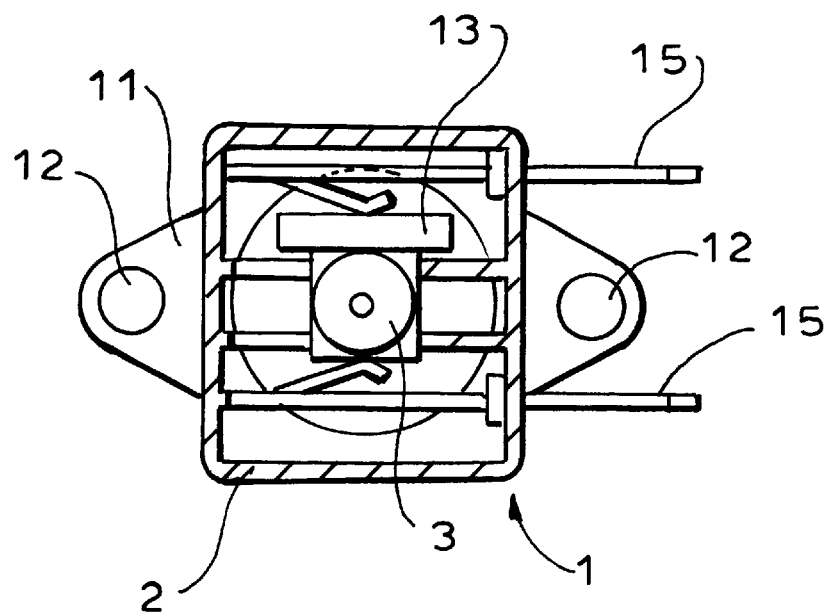

FIGS. 1, 2, 3 show a first possible embodiment of the actuator device according to the present invention; specifically, according to said first embodiment the actuator device is of the kind capable of causing a thrust to an interlocked device (assuming for instance a flap of a conditioning system or a fluid flow baffle of a detergent dispenser in a washing machine).

Said device, indicated as a whole with 1. The device comprises a movable body 2, for instance made of plastic material, which acts as a housing with openings at its both ends.

The body 2 houses a first thermoactuator, indicated with 3, equipped with a relevant thrust element or small piston 4, and a second thermoactuator, indicated with 5, equipped with a relevant thrust element or small piston 6; an end of pistons 4 and 6 is confined within the relevant thermoactuators, whereas the other ends protrude out of them.

Both thermoactuators 3 and 5 are of a similar type and only differ from each other for the stroke length of their relevant pistons; in the example shown, the stroke of piston 4 is 6 mm, whereas piston 6 has a stroke of 3 mm.

Both thermoactuators 3 and 5 are housed in the main part of the body 2 and integral with it. As it can be seen, these two thermoactuators are opposite to each other, in the sense that the two pistons 4 and 6 are facing opposite directions.

A shaft indicated with 7 is at least partially housed within the body, said shaft being movable for the action of the piston 4 against the action of a spring 8, where said spring 8 is located between the body 2 and a flanged portion 7' of the shaft itself; as it can be noted, an end of the shaft 7 is in contact with the piston 4, whereas the opposite end protrudes through one of said openings on the body 2. On the opposite side, a supporting element 9 is at least partially housed within the body 2; such an element 9 is in contact with the piston 6 and has a flanged portion 9'; a spring indicated with 10 is located between said flanged portion 9' and the body 2.

The second end of the supporting element 9 protrudes from the body 2 through its second end opening and is integral with a fastening element indicated with 11; said fastening element has through-holes 12 through which the device 1 can be secured by means of screws to a fixed portion of the equipment on which the device will be used. Two heating elements indicated with 13 and 14 (e.g. thermistors with a positive temperature coefficient—PTC) are related to both thermoactuators 3 and 5, while 15 and 16 indicate their electric or supply terminals, respectively.

In the case shown above, a full portion of the body 2 indicated with IS is provided between both thermoactuators 3 and 5; such a portion IS determines a thermal insulation between both heating elements 13 and 14, thus their interaction will be avoided when only one of the two thermoactuators is required to operate.

Strikers indicated with 17 are defined within the body 2 on the side where the shaft 7 is housed; other similar strikers indicated with 18 are defined inside the body 2 on the side where the supporting element 9 is located.

The function of said strikers 17 and 18 is to provide mechanical stop for the motion of the shaft 7 and the motion of the body 2, respectively, as it will appear more clearly in the following description.

Both the thermoactuators 3 and 5 are of a known type and operate according to the principle previously described. When a supply signal reaches contacts 15 and 16, both the heating elements 13 and 14 generate heat, so causing the thermoexpansible material contained inside the body of the thermoactuators 3 and 5 to expand.

Such an expansion causes a linear motion to the pistons 4 and 6, lasting as long as the flanged portion 7' of the shaft 7 and the flanged portion 9' of the supporting element 9 do not come to rest against the strikers 17 and 18; therefore, as it can be anticipated, the thermoactuator 3 is capable of causing a change of the relative position between the shaft 7 and the body 2, whereas the thermoactuator 5 is capable of causing a change of the relative position between the body 2 and the supporting element 9.

When the supply signal on contacts 15 and 16 ceases, the thermal elements 13 and 14 will cool down and the pistons 4 and 6 go back to their initial rest positions, also due to the action of springs 8 and 11.

As described above, it will be apparent how a plurality of different positions can be obtained for the shaft end 7 protruding from the body 2, by supplying the heaters 13 and 14 in right time, i.e. for the shaft end 7 which exerts the thrust on the device interlocked with the actuator 1 according to the invention.

Figure 4B:
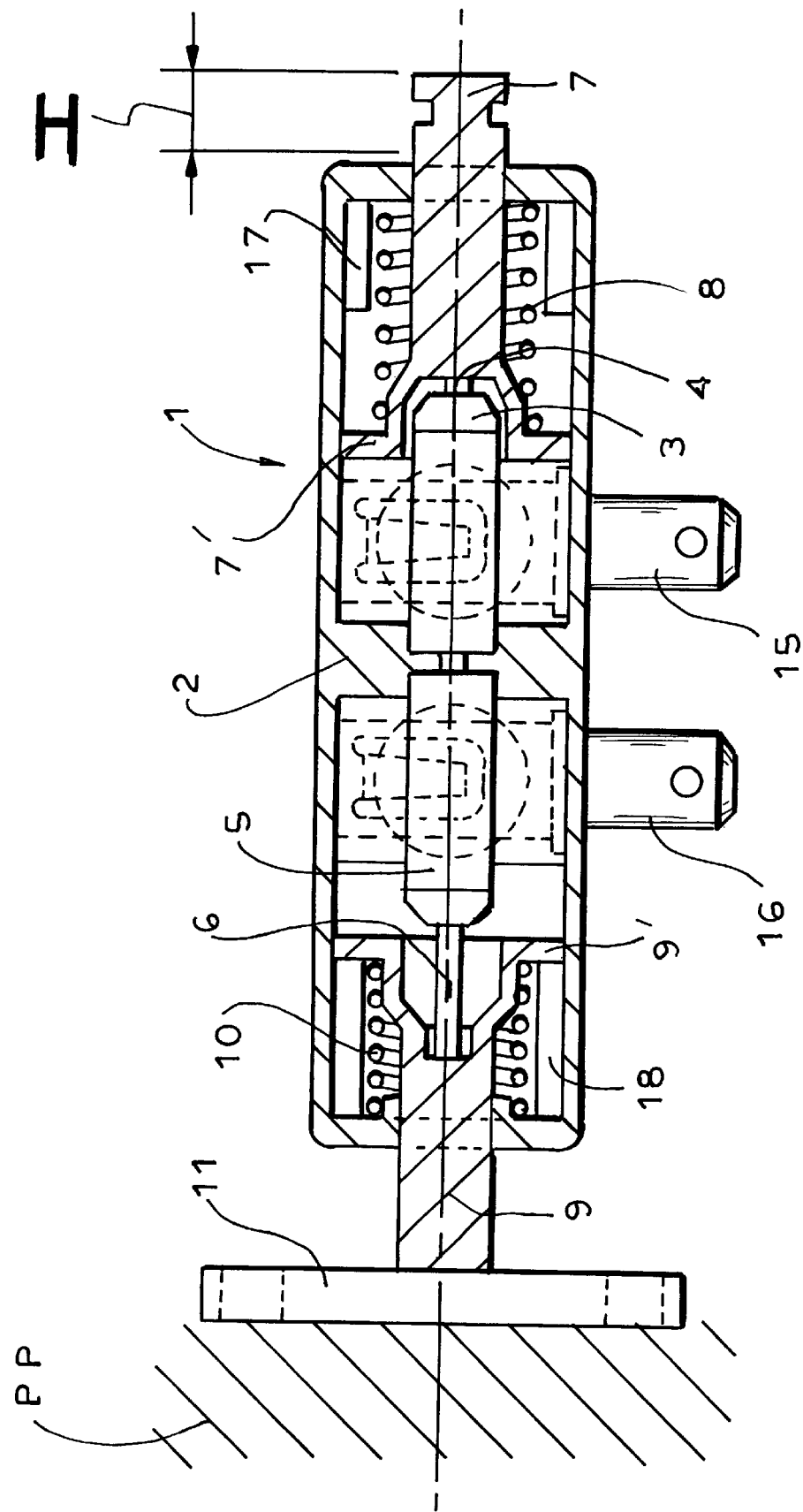
FIG. 4 shows the device of FIGS. 1–3 in four different operating conditions.

To this purpose, operation of the device 1 shown in the FIGS. 1–3 will now be described with reference to FIGS. 4A–4D, wherein the device 1 is secured to a fixed portion indicated with PP (e.g. a household appliance) through the fastening element 11. Portion A of FIG. 4A shows the device 1 in a state with no supply signal on the contacts 15 and 16 and with both pistons 4 and 6 in an initial rest position. As it can be seen, in such a state the shaft 7 is entirely back due to the action of the spring 8; also the body 2 is entirely back to the supporting element due to the action of the spring 11; as a result the external shaft end 7 will be on a first operative position.

In FIG. 4B the device 1 is shown in a state where an electric supply signal is available on terminals 16, whereas terminals 15 have no supply signal. In this instance, only the heater 14 and consequently only the thermoactuator 5 will be enabled; the resulting thrust of the piston 6 on the supporting element 9 will determine a translation of the movable body 2 (which, as said, is integral with the two thermoactuators 3 and 5) and of all the elements contained therein; the relevant motion between the supporting element 9 and the body 2 will cease when the strikers 18 come to rest against the flanged portion 9' of the element 9. Thus, the external end of the shaft 7 will take a second position indicated with I in the Figure, which in the above example covers one third of the total stroke of the device 1.

When the electric supply to the heating element 14 ceases, the thermoactuator 5 will cool down and the piston 6 return to its back position due to the action of the elastic device consisting of the spring 10, whereby the device 1 takes again its working position as shown in FIG. 4A.

In FIG. 4C the device 1 is shown in a state with an electric supply signal on terminals 15, whereas there is no supply signal on terminals 16. In this case, the heating element 13 will be enabled with an ensuing motion of the piston 4. The thrust of the piston 4 on the shaft 7 determines a translation of the latter, as long as the flanged portion 7' does not come to rest against the strikers 17; in this situation, the external end of the shaft 7 will take a third position represented in the Figure with II, which according to the case shown in the example covers two thirds of the total stroke of the device 1.

Also in this instance, when the electric supply to the heating element 13 ceases, the thermoactuator 3 will cool down and both the shaft 7 and piston 4 return to their original back position (FIG. 4A) due to the action of the elastic device consisting of the spring 8.

In FIG. 4D the device 1 is finally represented in a state where an electric supply signal is available on both terminals 15 and terminals 16; in this case, both the thermoactuators 3 and 5 are enabled, so that the pistons 4 and 6 will be motioned. In such a state there is obviously a summation of the translation previously indicated with I and II and the external end of the shaft 7 will take a third position indicated with III, which covers the maximum stroke of the device 1 according to the invention.

Figure 7:
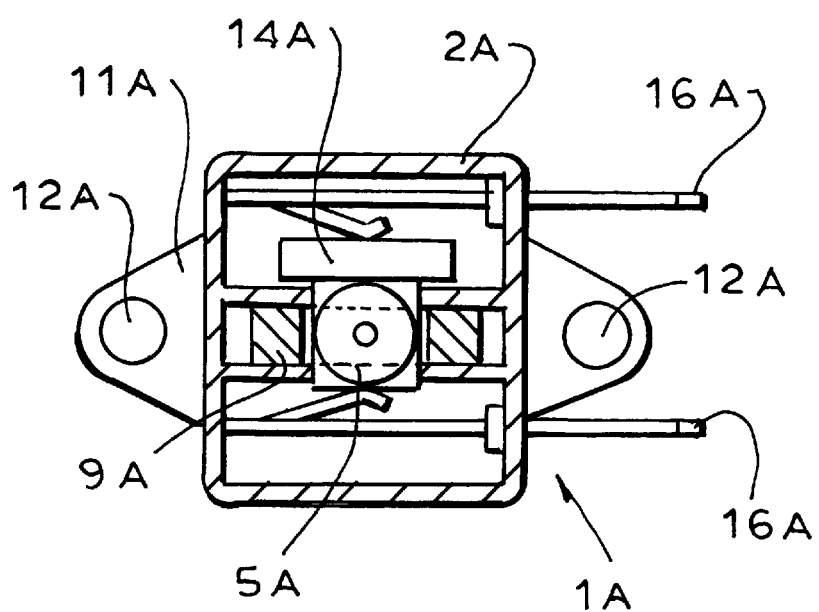
FIGS. 6 and 7 respectively show a section of the device of FIG. 5 along the axis C—C and axis D—D, respectively.
Figure 6:
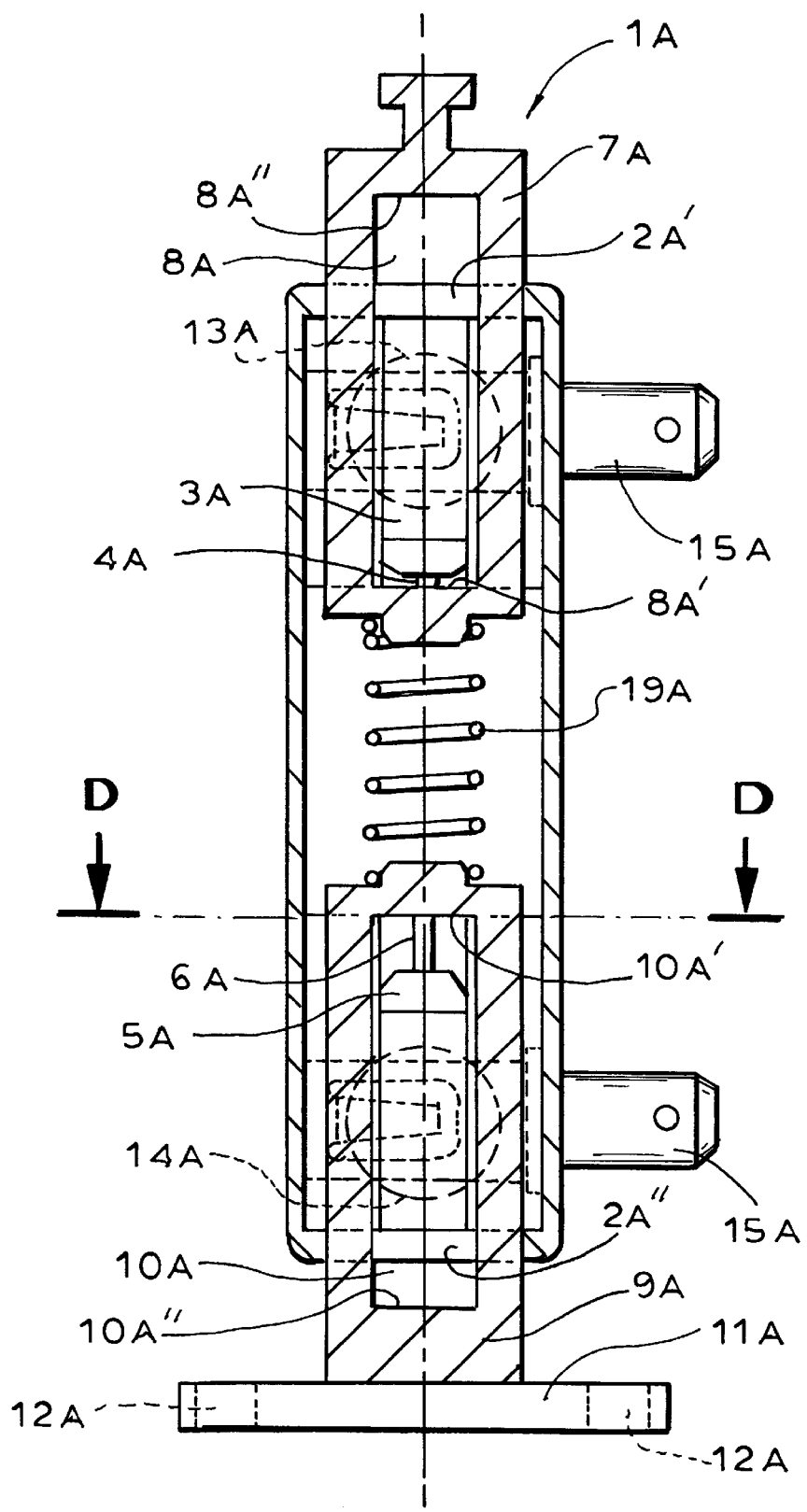

FIGS. 5, 6, 7 show a second embodiment of the actuator device according to the present invention; specifically, according to such a second embodiment, the actuator device is of a type capable of exerting a traction on an interlocked device.

In these figures, the actuator device 1A according to the invention comprises a movable body 2A acting as a housing with openings at its two ends.

The body 2A houses a first thermoactuator 3A, equipped with a relevant thrust element or piston 4A and a second thermoactuator indicated with 5A equipped with a relevant thrust element or piston 6A.

Also according to this embodiment the two thermoactuators 3A and 5A are of similar type and only differ from each other for the stroke length of their relevant pistons; also in this instance the stroke of piston 6A is 3 millimeters whereas piston 4A has a 6 millimeter stroke.

Both the thermoactuators 3A and 5A are housed on both ends of the body 2A and are integral with it; as it can be noted, both thermoactuators are facing each other, i.e. both pistons 4A and 6A are located one in front of the other.

A shaft indicated with 7A, which has a main cavity 8A in line with the thermoactuator 3A is housed at least partially within the body 2A; as it can be seen in particular from FIG. 7, the shaft 7A is configured to surround the thermoactuator 3A through said cavity 8A without interference, thus permitting conversion of the thrust movement of piston 4A to a traction movement of the shaft 7A; to this purpose, the piston 4A is in contact with an internal surface 8A' of the cavity 8A, whereas an opposite surface 8A" of said cavity realizes, in conjunction with a portion 2A' of the body 2A, a mechanical end of stroke.

On its opposite side, the body 2A houses at least partially a supporting element 9A; also this element 9A has a main cavity 10A in line with the thermoactuator 5A; in this instance, too, the piston 6A is in contact with an internal surface 10A' of the cavity 10A, whereas an opposite surface 10A" of said cavity provides a mechanical end of stroke in conjunction with a portion 2A" of the body 2A.

Bother internal ends of the shaft 7A and of the supporting element 9A are facing inside the body 2A and a spiral spring indicated with 19A between the two, works in opposition; the other ends of the shaft 7A and of the element 9A protrude from the body 2A through its end openings mentioned above.

The supporting element 9A is integral with a fastening element, indicated with 11A, provided with through-holes 12A to secure the device 1A by means of screws to a fixed portion of the equipment on which the device itself will be used. 13A and 14A indicate two heating elements (e.g. thermistors with positive temperature coefficient—PTC) for both thermoactuators 3A and 5A while 15A and 16A indicate their electric contacts or terminals, respectively. Both thermoactuators 3A and 5A are of the above type and operate according to the principle previously described.

Operation of the device 1A is similar to that of the device 1 in FIGS. 1–3 and FIGS. 4A–4D, the only difference being that in the device 1A the pistons of both thermoactuators 3A and 5A are capable of imparting a translation to both the shaft 7A and body 2A in the opposite direction to the one described above.

Also for this embodiment of the present invention it is clear how a plurality of different positions for the shaft end 7A protruding out of the body 2A can be obtained by supplying both the thermoactuators 13A and 14A in proper times, i.e. for the end of the shaft 7 which operates in traction on the device interlocked with the actuator 1A.

To this purpose, operation of the device 1A of FIGS. 5–7 will now be shown with reference to the FIGS. 8A–8D in the Figures, PP indicates a fixed portion where the device 1A is secured to through the fastening element 11A.

In FIG. 8A, the device 1A is shown in the state where contacts 15A and 16A have no electric supply signal available and both pistons 4A and 6A are in their initial rest position.

As it will be noted, in this state the shaft 7A is entirely forward due to the action of spring 19A while the body 2A—also due to the action of spring 19A—is entirely forward on the supporting element 9A; thus, the external end of the shaft 7A is in a first operating position.

Figure 8B:
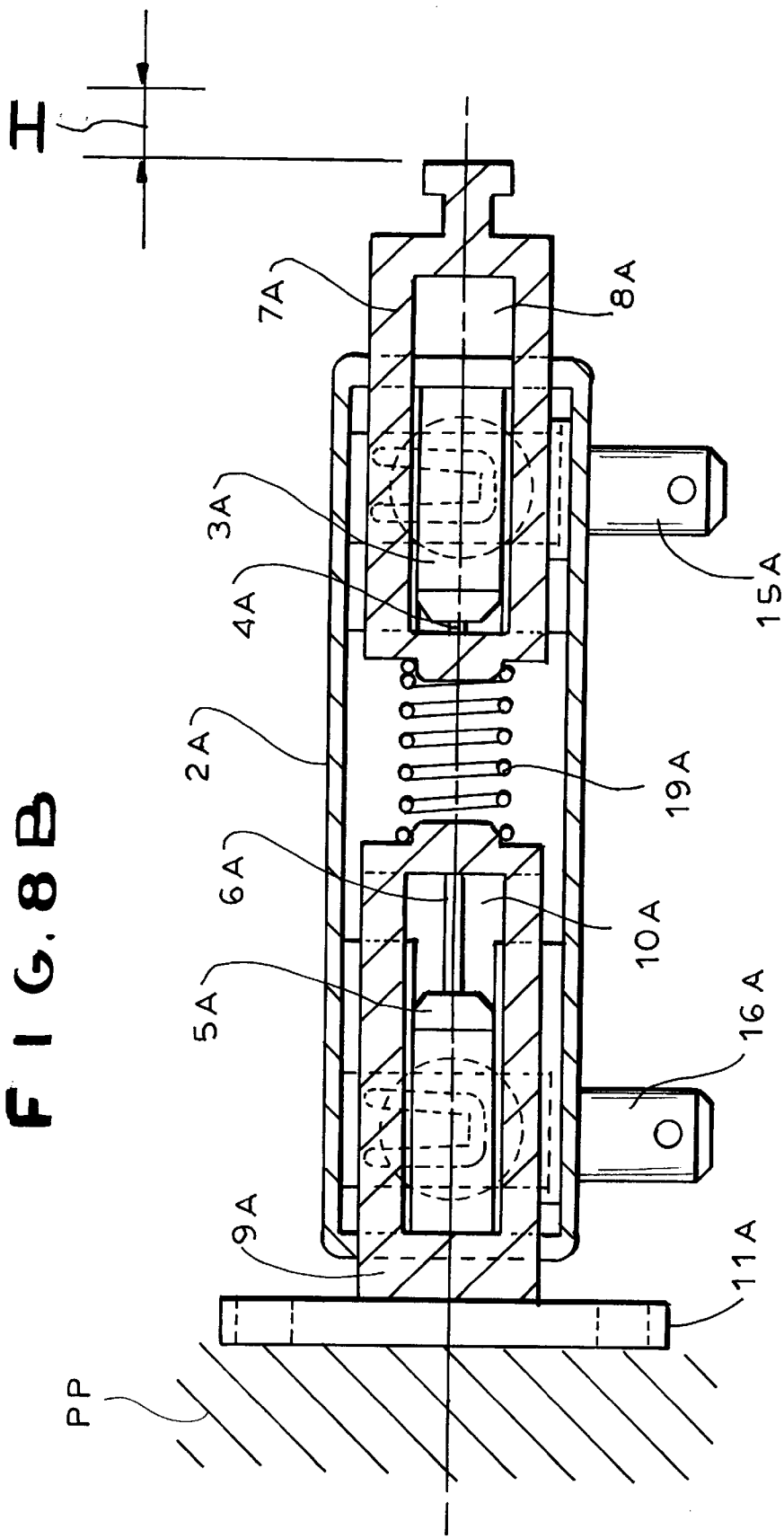
Figure 8C:
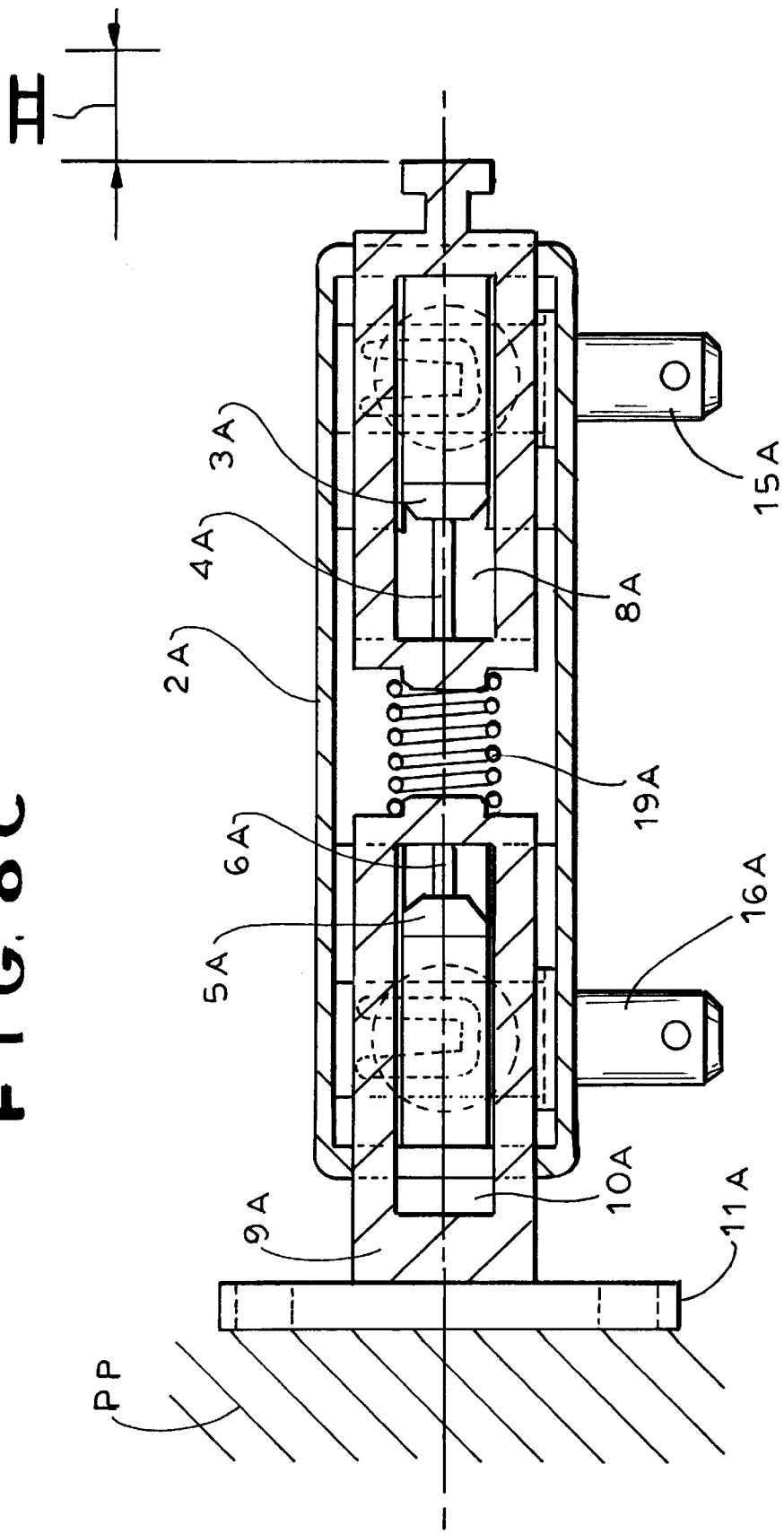

In FIG. 8B the device 1A is shown in the state where terminals 16A have an electric supply signal available, whereas the terminals 15A have no supply signal.

In this instance, only the heater 14A will be enabled and consequently only the thermoactuator 5A; the following thrust of the piston 6A on the supporting element 9A causes a translation of the movable body 2A (which, as said above, is integral with the two thermoactuators 3A and 5A) and of all the elements contained therein; the relevant motion between the supporting element 9A and the body 2A will cease when the portion 2A" of the body 2A comes to rest against the surface 10A".

Thus, the external end of the shaft 7A will take a second position, which is back in respect to the first one, indicated with I in the figure, which in the example covers one third of the total stroke of the device 1.

When the electric supply to the heating element 14A ceases, the thermoactuator 5A will cool down and further to the action of the elastic device consisting of the spring 19A the piston 6A returns to its back position, hence the device 1A will take again the operating position shown in FIG. 8A.

The portion C of FIG. 8 shows the device 1A in the state where terminals 15A have an electric supply signal available, whereas terminals 16A have no supply signal. In this case the heating element 13A will be enabled with a consequent motion of the piston 4A. The thrust of the piston 4A on the shaft 7A causes a translation of the latter as long as the surface 8A" does not come to rest against the portion 2A' of the body 2A; in this state, the external end of the shaft 7A takes a third position shown in the figure with II, which is back with reference to the previous one, which in the example covers two thirds of the total stroke of the device 1A.

Also in this instance, when the electric supply to the heating element 13A ceases, the thermoactuator 3A will cool down and following the action of the elastic device consisting of the spring 19A both the shaft 7A and the piston 4A go back to their original position (FIG. 8A).

Figure 8D:
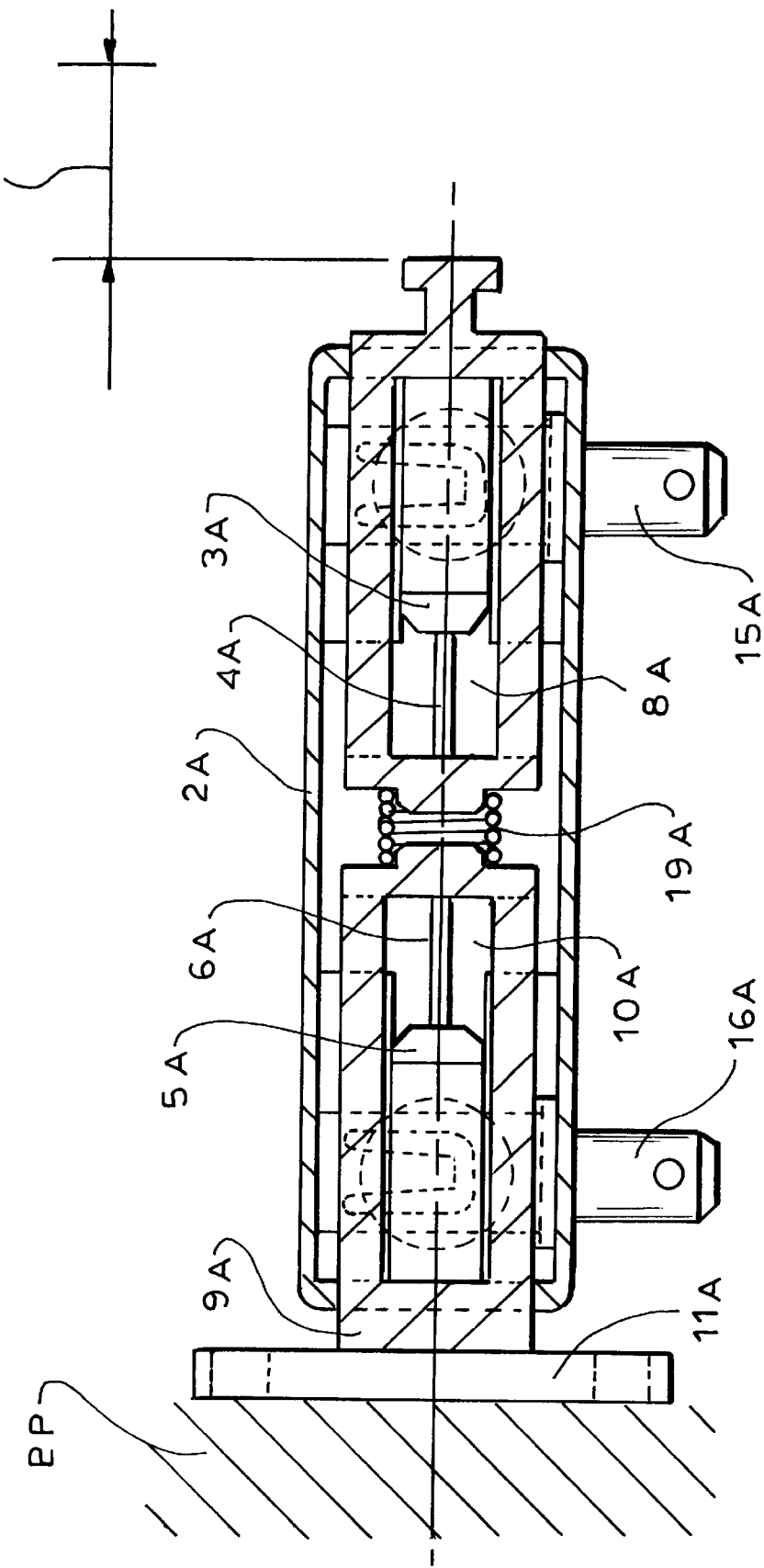

Finally, FIG. 8D shows the device 1A in the state where a feed signal is available on terminals 15A and terminals 16A. In this instance, both the thermoactuators 3A and 5A are enabled, hence the pistons 4A and 6A are motioned. In this state there is obviously a sum of the translation previously indicated with I and II while the external end of the shaft 7A will take a third position, indicated with III, further back with respect to the previous ones, covering the maximum stroke of the device 1A according to the invention.

Figure 9:
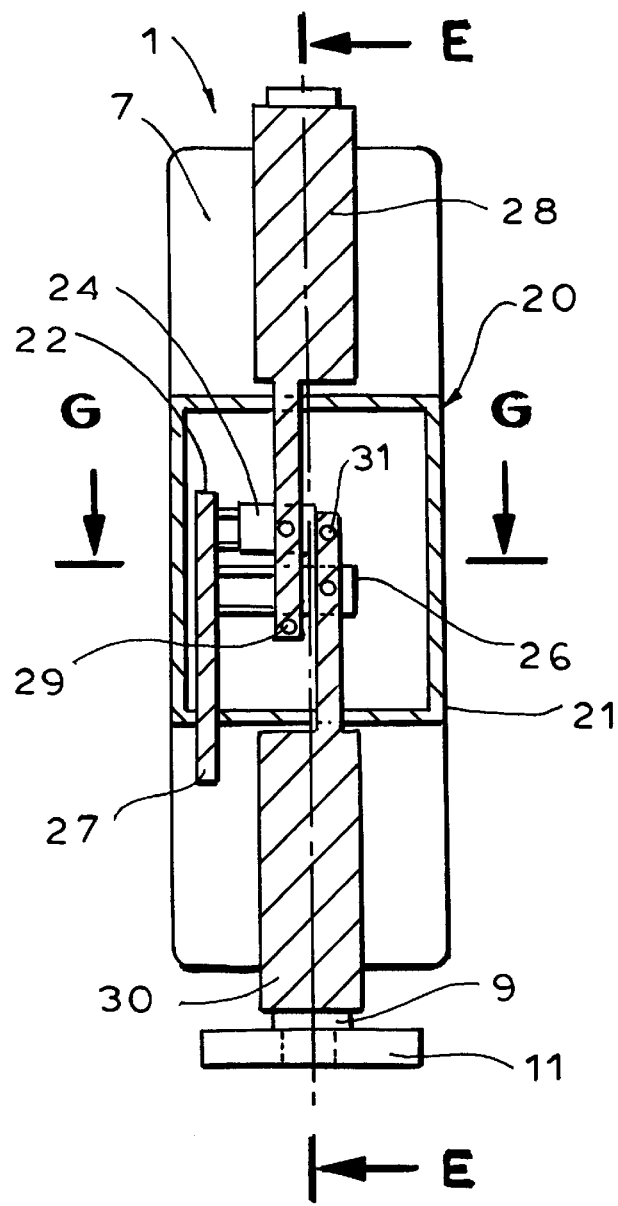
FIG. 9 shows a section of the device according to the present invention, in a third possible embodiment the section being taken along the line F—F of FIG. 10.
Figure 11:
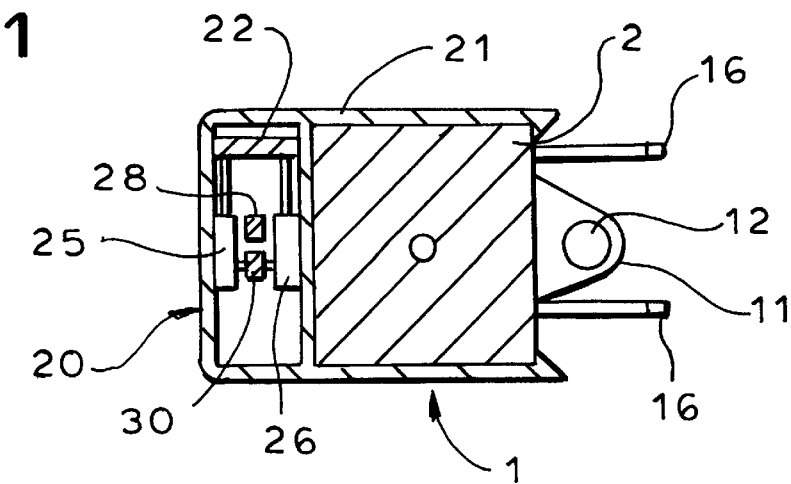
FIGS. 10 and 11 respectively show a section of the device of FIG. 9 along the line E—E of FIG. 9 and line G—G of FIG. 9, respectively.
Figure 10:
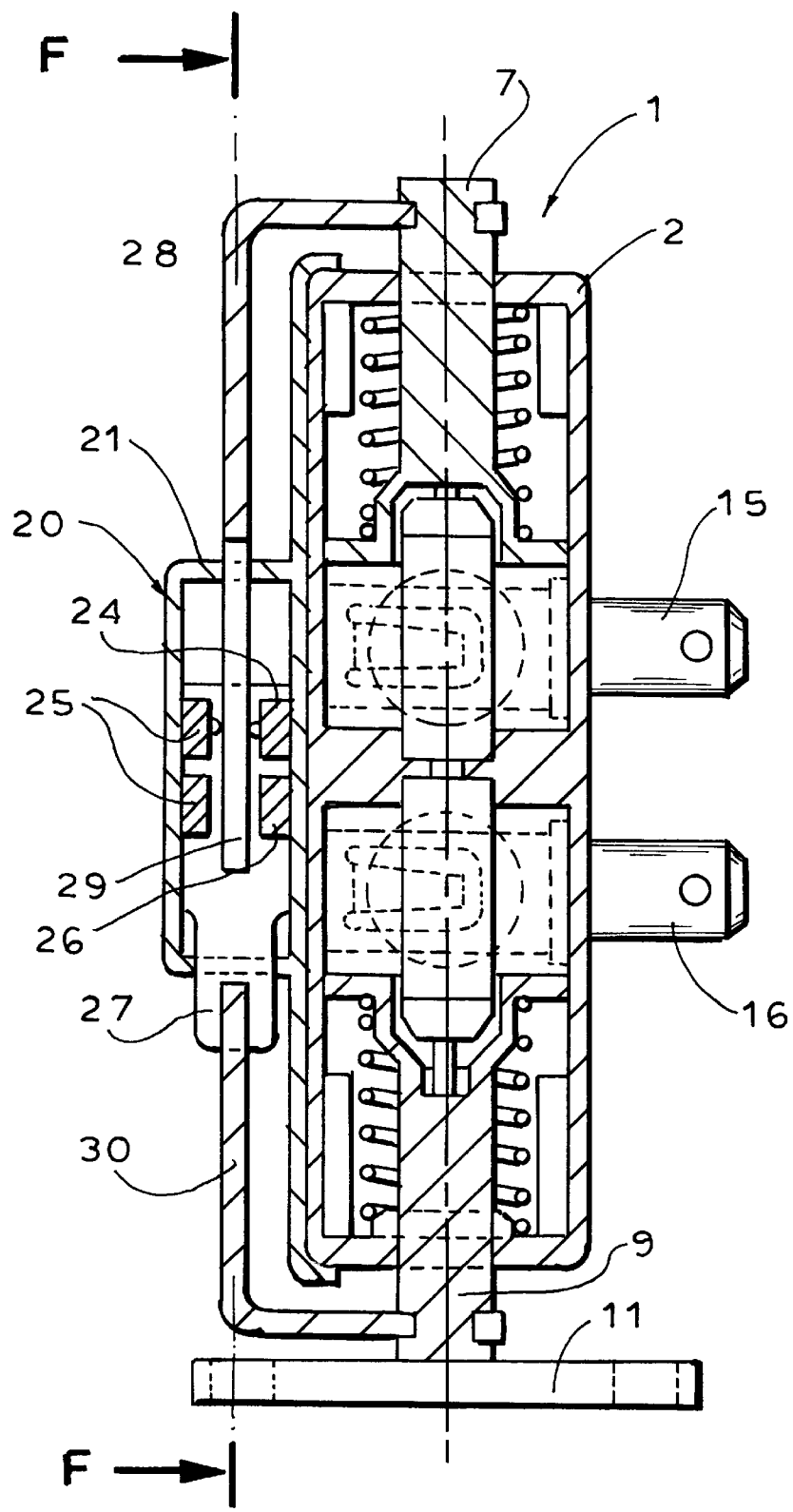

FIGS. 9, 10, 11 show a third embodiment of the actuator device according to the present invention. The device according to the invention shown in said figures is substantially similar to the one of FIGS. 1–3; however, it further comprises a positioning sensor 20, capable of providing a signal as a function of the operating position of the shaft 4; in the non limiting example, the sensor 20 is of the optical type and the relevant positioning signal is of the binary digital type.

More in particular, the sensor 20 shown in the FIGS. 9–11 comprises a body 21 housing an integrated circuit 22 fitted with pairs of optical sensors 23, 24, 25, 26 and whose end 27 is configured to provide a male type connector. Sensors 23 and 25 are light emitters, such as LED diodes, which are respectively mated with light receivers, such as phototransistors consisting of sensors 24 and 26.

The sensor 20 also comprises a first movable element, indicated with 28, which is integral with the shaft 7 and has a hole 29, and a second movable element indicated with 30, which is integral with the supporting element 9 and has a hole 31.

Receivers 24 and 26 generate an electric signal, which varies as a function of the light reception from the emitters 23 and 25. Specifically, under similar conditions as those in FIG. 4A, light transmission from the emitters 23 and 25 to the receivers 24 and 26 is cut off by elements 28 and 30, respectively.

Under similar conditions as in FIG. 4B, light transmission from the emitter 25 to the receiver 26 is permitted through the hole 31 of the element 30, with a consequent change of the electric signal to the connector 27.

Under similar conditions as for FIG. 4C, light transmission from the emitter 23 to the receiver 24 is permitted through the hole 29 of the element 28, with a consequent change of the electric signal to the connector 27.

Under similar conditions as for FIG. 4D, light transmission is obviously permitted from both the emitter 25 to the receiver 26 and from the emitter 23 to the receiver 24, with a further change of the electric signal.

As described above, it will be clear that the different combinations of the electric signal to the connector 27 may take four values, according to a binary logic, which allow identification of the four states highlighted in FIGS. 4A–4D (or in FIGS. 8A–8D).

The use of the sensor 20 may prove useful for certain applications of the device according to the invention, right for the purpose of identifying the time when a given working position has been reached.

The characteristics of the actuation device being the subject of the present invention will be apparent from the above description as also its advantages are clear. Specifically, as described above, it is clear how the device according to the invention is capable of providing a thrust or traction actuator function with more than two stable working positions, just using simple, compact, low-cost, reliable components (such as thermoactuators, springs and small shafts), without the need of any complex kinematic systems, circuits or operative sequences.

As previously mentioned, the device object of the invention finds advantageous application in the household appliances field, in particular as actuator for fluid flow deviation systems, such as for instance for the dispensers of washing agents.

Moreover, a further field of application relates to conditioning and hydraulic systems in general, where the device object of the invention may represent a performing actuator for duct baffles or valves, according to different opening degrees and/or angles.

Finally, it is obvious that many changes to the actuation device described above by way of example are possible for the skilled man, without departing from the innovation spirit of the inventive idea.

For instance, the thermoactuators of the device could be similar to each other, and a different positioning of the various end of stroke elements could be provided in order to obtain a plurality of different working positions; similarly, both thermoactuators could have the same piston stroke, but in this case the pistons, in their rest position, would protrude with different lengths from the body of their related thermoactuator.

Moreover, to obtain the required plurality of working positions the thermoactuators could also be positioned to have their relevant pistons operating in the same direction.

Moreover, the device could also have a modular configuration, for connection in series of more devices similar to each other; for instance, the starting module could comprise the supporting element, a spring, a portion of the movable body and have a relevant thermoactuator integral with it. Additional modules would then be fastened to this portion of the movable body, each one of them comprising another portion of movable body with an associated thermoactuator, shaft and spring element, so as to increase both the total stroke and number of the intermediate positions of the device. The various devices connected in series between themselves could then be inserted in a further mobile body wherein the single bodies 2 are movable.

Under these circumstances it is also obvious that thrust actuation modules (FIGS. 1–3) and traction actuation modules (FIGS. 5–7) could be combined together.

We claim:

1. An actuation device, comprising:
   at least a first and a second thermoactuator, each having a housing containing a thermoexpansible material, an electric heating element, contact means for the electrical supply to said heating element and a thrust element which is moved by said thermoexpansible material, each of said thrust elements being capable of performing a predetermined stroke to operate a movable actuation element;
   a fixed body adapted to be mounted on a supporting element;
   a movable body free to move with respect to said fixed body; and
   at least one elastic device located within said movable body, said movable actuation element being capable of taking a plurality of stable working positions, which are obtained in function of the presence of an electric supply signal to the contact means of one or another or more than one of said thermoactuators, said first thermoactuator and second thermoactuator being integral with said movable body and said movable actuation element being operated by said thrust element of said first thermoactuator, whereas said second thermoactuator operates through its own thrust element on one end of said fixed body.

2. Actuator device, according to claim 1, whereby said thermoactuators are opposed to each other, so that their relevant thrust elements are facing towards the outside of said movable body.

3. Actuator device, according to claim 1, whereby in presence of electric supply to the contact means of said first thermoactuator, the relevant thrust element is capable of determining a first translation of said movable actuation means toward the inside of said movable body and whereby in presence of electric supply to the contact means of said second thermoactuator, the relevant thrust element is capable of determining a second translation of said movable body to approach it in respect to said fixed body.

4. Actuator device, according to claim 3, whereby inside said movable body only one elastic element is provided.

5. Actuator device, according to claim 3, whereby said thermoactuators face each other, so that their relevant thrust elements are directed toward the inside of said movable body.

6. Actuator device, according to claim 1, whereby a positioning sensor is provided, which is fit to supply an electric signal as a function of the position of said movable actuation element with respect to said fixed body, said positioning sensor being in particular of the optical type and said electric signal being in particular of the binary type.

7. Actuator device, according to claim 1, whereby said stroke predetermined by the thrust element of said first thermoactuator has a substantially double length in respect to the stroke predetermined by the thrust element of said second thermoactuator.

8. Actuator device, according to claim 1, whereby said thermoactuators are similar.

9. Actuator device, according to claim 1, whereby it is of modular type, to permit more single modules to be connected in series and increase the total stroke and/or the number of intermediate positions of the device itself.

10. Actuation method, according to claim 3, whereby said first position covers about one third of the maximum stroke of said movable actuation means with respect to said fixed element, whereby said second position covers about two thirds of the maximum stroke of said movable actuation element with respect to said fixed element and whereby said third position covers the maximum stroke of said movable actuation element with respect to said fixed element.

11. An actuation device, comprising:
  at least a first and a second thermoactuator, each having a housing containing a thermoexpansible material, an electric heating element, contact means for the electrical supply to said heating element and a thrust element which is moved by said thermoexpansible material, each of said thrust elements being capable of performing a predetermined stroke to operate a movable actuation element;
  a fixed body adapted to be mounted on a supporting element;
  a movable body free to move with respect to said fixed body; and
  at least one elastic device located within said movable body, said movable actuation element being capable of taking a plurality of stable working positions, which are obtained in function of the presence of an electric supply signal to the contact means of one or another or more than one of said thermoactuators, said first thermoactuator and second thermoactuator being integral with said movable body and said movable actuation element being operated by said thrust element of said first thermoactuator, whereas said second thermoactuator operates through its own thrust element on one end of said fixed body, whereby in presence of the electric supply to the contact means of said first thermoactuator to connect said supply to the heating element whereby the relevant thrust element is capable of determining a first translation of said movable actuation element towards the outside of said movable body and whereby in presence of electric supply to the contact means and heating element of said second thermoactuator the relevant thrust element is capable of determining a second translation of said movable body to move it away from said fixed body.

12. Actuator device, according to claim 11, whereby a first elastic element is provided between said movable actuation element and said movable body, to develop a directional thrust on said movable actuation means contrary to said first translation and whereby it provides a second elastic element between said movable body and said fixed body, to develop a directional thrust on said movable body contrary to said second translation.

13. Actuation method for obtaining either a thrust or a traction through a movable actuation means, said method being based on the use of thermoactuators that comprise housings containing thermoexpansible material, electric heating elements, contact means to electrically supply said heating elements and thrust elements fit to be motioned through said thermoexpansible materials, where said thrust elements are fit to perform predetermined strokes, whereby at least two thermoactuators are associated with the same body to obtain a plurality of stable working positions for said movable actuation means, so that the thrust of a thrust element is able to produce a translation of said movable actuation means with respect to said body and the thrust of the other thrust element is able to produce a translation of said body with respect to a fixed element associated with it, where said plurality of positions is achieved in function of the electric supply to the contact means of one or another or more than one of said thermoactuators and whereby:
  in the presence of electric supply only to the contact means and heating element of a thermoactuator, said movable actuation element takes a first position with respect to said fixed element;
  in presence of electric supply only to the contact means and heating element of the other thermoactuator, said movable actuation element takes a second position with respect to said fixed element, and
  in presence of the electric supply to the contact means of both thermoactuators, said movable actuation element takes a third position with respect to said fixed element.

14. Actuation method, according to claim 13, whereby said thrust elements exert a thrust in opposite directions.

* * * * *

UNITED STATES PATENT AND TRADEMARK OFFICE
CERTIFICATE OF CORRECTION

PATENT NO.    : 5,968,395
DATED         : 19 October 1999
INVENTOR(S)   : Costanzo GADINI et al It is certified that error appears in the above-identified patent and that said Letters Patent is hereby corrected as shown below:

Title page,
After line [22] and before line [51] in the heading in the left hand column of page 1 of the patent, read -- [30] Foreign Application Priority Data
   Dec. 29,1995 [IT] Italy .... To 95 A 001060 --

Signed and Sealed this

First Day of August, 2000

Attest:

Attesting Officer

Q. TODD DICKINSON

Director of Patents and Trademarks